United States Patent
Imai (10) Patent No.: US 8,614,767 B2
(45) Date of Patent: Dec. 24, 2013

(54) PREVIEW IMAGE DISPLAY COMPENSATION BASED ON ENVIRONMENTAL LIGHTING CONDITIONS

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 12/886,075

(22) Filed: Sep. 20, 2010

(65) Prior Publication Data

US 2012/0069221 A1    Mar. 22, 2012

(51) Int. Cl.
*H04N 5/225* (2006.01)
*H04N 5/222* (2006.01)
*G03B 3/00* (2006.01)
*G03B 7/26* (2006.01)
*H01L 35/00* (2006.01)
*H02J 7/00* (2006.01)

(52) U.S. Cl.
USPC ...... 348/372; 348/333.13; 348/730; 396/129; 396/221; 396/303; 136/206; 320/101

(58) Field of Classification Search
USPC .......... 348/372, 208.16, 333.01–333.13, 371, 348/730; 396/129, 203, 205, 221, 301, 303, 396/304; 136/206; 320/101; 345/690, 345/204–207

See application file for complete search history.

(56) References Cited

U.S. PATENT DOCUMENTS

| | | | |
|---|---|---|---|
| 4,037,234 A | 7/1977 | Tunekawa et al. | |
| 4,563,727 A | 1/1986 | Curiel | |
| 5,424,800 A | 6/1995 | Suzuki | |
| 5,519,468 A | 5/1996 | Ohtake | |
| 6,636,646 B1 | 10/2003 | Gindele | |
| 6,731,797 B2 | 5/2004 | Prentice | |
| 6,829,016 B2 | 12/2004 | Hung | |
| 7,289,154 B2 | 10/2007 | Gindele | |
| 7,330,209 B2 | 2/2008 | Osamato | |
| 7,355,611 B2 | 4/2008 | Bianchi et al. | |
| 7,564,212 B2 * | 7/2009 | Li et al. | 320/101 |
| 7,623,706 B1 | 11/2009 | Maurer | |
| 2001/0043277 A1 * | 11/2001 | Tanaka et al. | 348/333.01 |
| 2004/0113903 A1 * | 6/2004 | Mikami et al. | 345/204 |
| 2006/0118166 A1 | 6/2006 | Iwaki | |
| 2007/0092136 A1 | 4/2007 | Zhao et al. | |
| 2007/0296835 A1 | 12/2007 | Olsen et al. | |
| 2009/0185120 A1 * | 7/2009 | Yoon et al. | 349/116 |
| 2011/0267324 A1 * | 11/2011 | Stephens | 345/207 |

* cited by examiner

*Primary Examiner* — Nhan T Tran
*Assistant Examiner* — Marly Camargo
(74) *Attorney, Agent, or Firm* — Fitzpatrick, Cella, Harper & Scinto (57) ABSTRACT

An image capture device includes an image sensor for capturing image data of a scene, and a display screen for displaying a preview of the captured image of the scene. Additionally, the image capture device includes a photovoltaic solar cell for outputting electrical energy responsive to environmental lighting conditions. A control section determines whether the image capture device is or is not currently being used in a bright environment. Responsive to a determination that the image capture device is currently being used in a bright environment, the control section increases brightness of the display screen, and switches electrical energy outputted from the photovoltaic cell for use by the display screen.

29 Claims, 7 Drawing Sheets

PREVIEW IMAGE DISPLAY COMPENSATION BASED ON ENVIRONMENTAL LIGHTING CONDITIONS

FIELD

The present disclosure relates to display of a preview image on an image capture device, and more particularly relates to adjusting a display of the preview image.

BACKGROUND

In the field of digital photography/imaging, it is common to display a preview image on an image capture device. For example, a user's digital camera may include a screen for displaying a preview of an image to be captured. By displaying the preview image, it is ordinarily possible for a user to confirm the contents of a scene before capturing the image.

SUMMARY

One challenge with displaying a preview image relates to the conditions under which the user views the preview image. For example, in a bright environment, it becomes more difficult for the user to see the preview image. While this problem can be reduced somewhat by brightening the display of the preview image, the brightened display consumes significant battery power, reducing the amount of time the user is able to operate the camera.

The foregoing situation is addressed by using energy gathered from a photovoltaic solar cell for use in display of the preview image.

Thus, in an example embodiment described herein, an image capture device includes an image sensor for capturing image data of a scene, and a display screen for displaying a preview of the captured image of the scene. Additionally, the image capture device includes a photovoltaic solar cell for outputting electrical energy responsive to environmental lighting conditions. A control section determines whether the image capture device is or is not currently being used in a bright environment. Responsive to a determination that the image capture device is currently being used in a bright environment, the control section increases brightness of the display screen, and switches electrical energy outputted from the photovoltaic cell for use to power the brightened display screen.

By using energy gathered from a photovoltaic solar cell for use in display of the preview image, it is ordinarily possible for a user to more clearly view the preview image in unfavorable environmental conditions, while at the same time conserving battery power.

In another example embodiment, there is a determination of whether to enhance the image quality of the preview displayed by the display screen based on luminance information of the scene. In some embodiments, the luminance information may be obtained by calculations using the image data from the image sensor and an exposure meter, and in some embodiments the luminance information may be obtained based on brightness information indicative of the environmental lighting conditions obtained by sampling the electrical energy from the photovoltaic solar cell. In particular, chromatic information of the scene is obtained by calculations using the image data from the image sensor, and an enhancement of image quality of the preview displayed by the display screen is effected by increasing colorfulness of the chromatic information in a case where there is a determination that the image capture device is currently being used in a bright environment.

In still another example embodiment, there is a determination of whether the image capture device is or is not currently being used in an image capture mode. Responsive to a determination that the image capture device is not currently being used in the image capture mode, electrical energy outputted from the photovoltaic solar cell is switched for use in recharging the rechargeable battery.

This brief summary has been provided so that the nature of this disclosure may be understood quickly. A more complete understanding can be obtained by reference to the following detailed description and to the attached drawings.

DETAILED DESCRIPTION

Figure 1A:
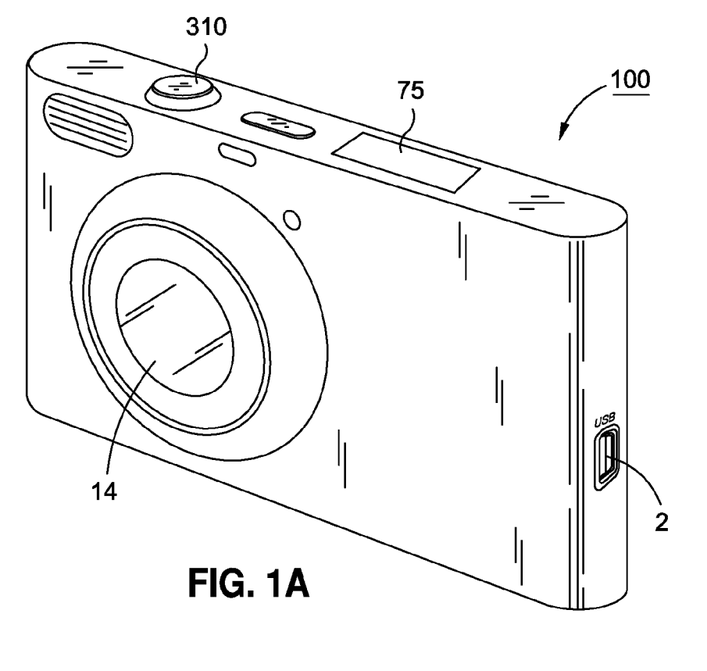
FIGS. 1A and 1B are representative views for explaining the exterior appearance of an image capture device relevant to one example embodiment.
Figure 1B:
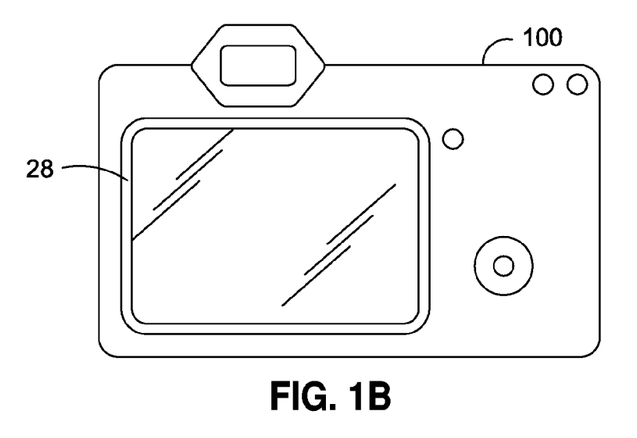

FIGS. 1A and 1B are representative views for explaining the exterior appearance of an image capture device relevant to one example embodiment. In these figures, some components are omitted for conciseness. As shown in FIGS. 1A and 1B, image capture device 100 is constructed as an embedded and hand held device including an image sensor 14 and a connector 2 for connection to external devices. In the embodiment of FIGS. 1A and 1B, interface connector 2 is a USB interface connector, but other wired and wireless interfaces may be used.

Image capture device 100 further includes a variety of user interfaces for permitting a user to interact therewith, such as shutter button 310, an image display unit 28 for displaying menus, thumbnail images, and a preview image, and a series of selector buttons for permitting display and selection of menu items. The image display unit 28 may be a liquid crystal screen.

Photovoltaic solar cell 75 is a device that converts the energy of sunlight directly into electricity by the photovoltaic effect, as will be described more fully below with respect to FIG. 2A. In that regard, while photovoltaic solar cell 75 is shown on the top of image capture device 100, other locations for the photovoltaic solar cell are possible.

While FIGS. 1A and 1B depict one example embodiment of image capture device 100, it should be understood that the image capture device 100 may be configured in the form of, for example, a digital camera, a video camera, or any type of device including a camera, such as a pager, a cellular telephone, a radio telephone, a personal digital assistant (PDA), a Moving Pictures Expert Group Layer 3 (MP3) player, and/or the like.

Figure 2A:
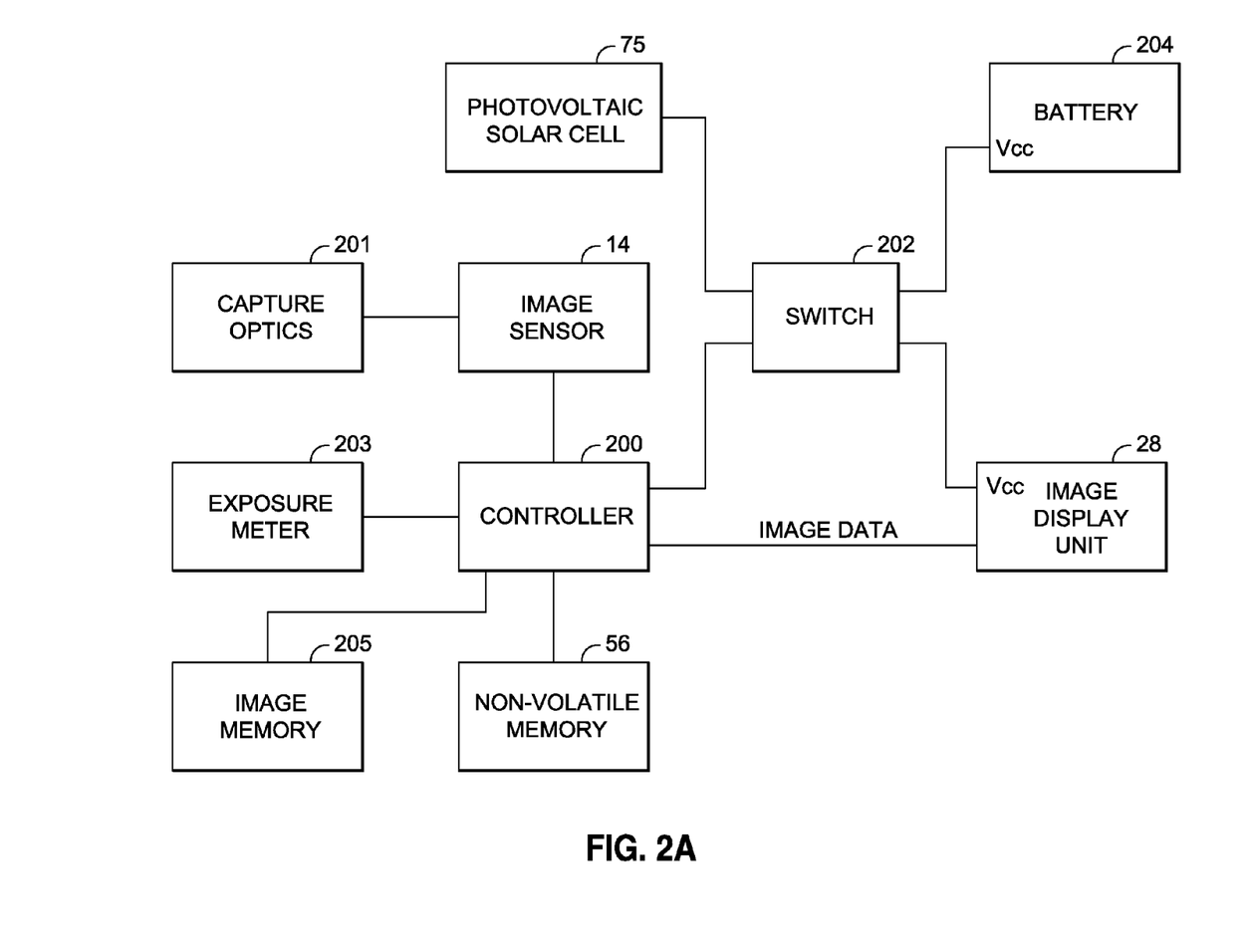
FIGS. 2A and 2B are detailed block diagrams for explaining the internal architecture of the image capture device shown in FIG. 1 according to one example embodiment.

FIG. 2A is a block diagram for explaining the internal architecture of the image capture device 100 shown in FIG. 1 according to one example embodiment.

As shown in FIG. 2A, image capture device 100 includes controller 200, capture optics 201, switch 202, exposure meter 203, battery 204, and image memory 205. Image capture device 100 further includes photovoltaic solar cell 75, image display unit 28, and non-volatile memory 56.

Image sensor 14 converts optical signals to electrical signals. In particular, image sensor 14 may convert optical signals obtained through the optical system 10 into analog signals. Examples of image sensors include a charge-coupled device (CCD) or a complementary metal-oxide-semiconductor (CMOS) active-pixel sensor, although numerous other types of image sensors are possible.

Figure 2B:
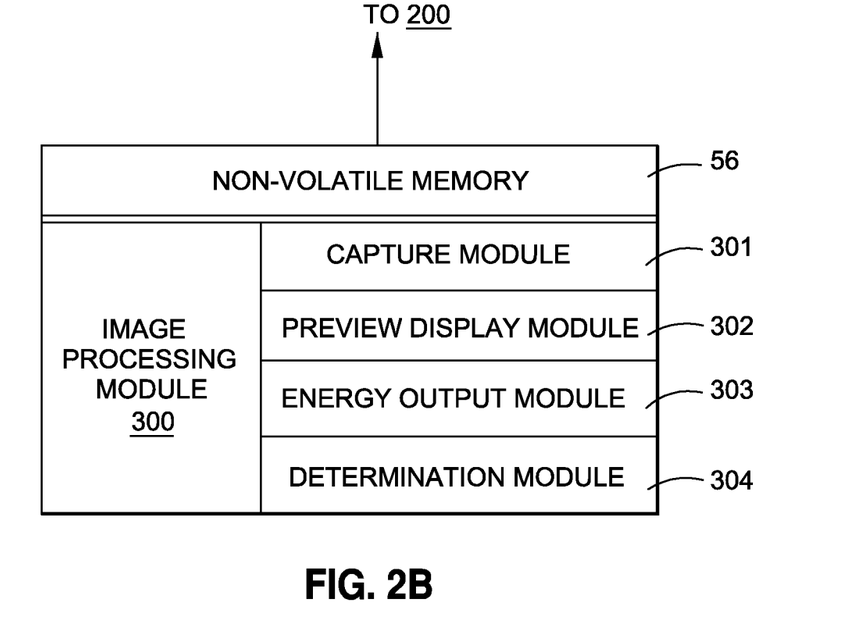

A nonvolatile memory 56 is an electrically erasable and recordable memory, and uses, for example, an EEPROM. The nonvolatile memory 56 stores constants, computer-executable programs, and the like for operation of controller 200. In particular, and as shown in FIG. 2B, non-volatile memory 56 is an example of a non-transitory computer-readable memory medium, having stored thereon image processing module 300 as described herein. According to this example embodiment, image processing module 300 includes a capture module 301, a preview display module 302, an energy output module 303 and a determination module 304, each of which are described more fully below.

Photovoltaic solar cell 75 is a device that converts the energy of sunlight directly into electricity by the photovoltaic effect. In that regard, while a single photovoltaic solar cell is shown in FIG. 1A, an image capture device may include a plurality of photovoltaic solar cells. Photons in sunlight hit the solar cell and are absorbed by semiconducting materials, such as silicon. Electrons are knocked loose from their atoms, allowing them to flow through the material to produce electricity. Due to the special composition of solar cells, the electrons are only allowed to move in a single direction. Thus, the photovoltaic solar cell converts photonic energy into electrical signals.

As described above, image display unit 28 is constructed to display menus, thumbnail images, and a preview image, and a series of selector buttons for permitting display and selection of menu items. The image display unit 28 may be a liquid crystal screen. Image display unit 28 may use power from photovoltaic solar cell 75 to brighten a preview image displayed to a user, as described more fully below.

Reference numeral 200 denotes a system controller, which controls the entire image capture device 100. The controller 200 executes programs recorded in the aforementioned non-volatile memory 56 to implement respective processes to be described later of this embodiment. For example, controller 200 may obtain luminance information of a scene by calculations using the image data from the image sensor 14, and the determination of a bright environment can made based on the luminance information. Controller 200 may further obtain brightness information indicative of the environmental lighting conditions by sampling the electrical energy from the photovoltaic solar cell 75, and the determination of a bright environment is made based on that brightness information. These processes will be described more fully below.

Capture optics 201 comprise an optical system for capturing data of a scene and producing image data. To that end, capture optics 201 may include, for example, an imaging lens, a shutter having an aperture function, and a shield, or barrier, which covers the lens of the image capture device 100 to prevent an image capturing system including the lens, shutter, and/or image sensor 14 from being contaminated or damaged.

In one example embodiment, a light beam (light beam incident upon the angle of view of the lens) from an object that goes through the capture optics (image sensing lens) passes through an opening of the shutter, and forms an optical image of the object on the image sensing surface of the image sensor 14.

Switch 202 is controlled by controller 200 so as to switch the recipient of electrical energy obtained from photovoltaic solar cell 75. Specifically, switch 202 may switch power generated from photovoltaic solar cell 75 to image display unit 28 or to battery 204.

Exposure meter 203 measures the total amount of light allowed to fall on image sensor 14 during the process of taking a photograph. In that regard, data obtained from exposure meter 203 may also be used to determine whether a preview image displayed on image display unit 28 should be brightened, as discussed more fully below.

Battery 204 is a primary power source such as an alkaline battery or a lithium battery, a secondary battery such as an NiCd battery, an NiMH battery or an Li battery, or the like. In one example embodiment herein, battery 204 is a rechargeable battery. Additionally, the image capture device 100 may include a battery compartment for holding such a rechargeable battery. Responsive to a determination that the image capture device is not currently being used in the image capture mode, electrical energy outputted from the photovoltaic solar cell can be switched by switch 202 for use in recharging the rechargeable battery.

Image memory 205 stores image data which is captured by the image sensor 14 and is converted into digital data, and image data to be displayed on the image display unit 28. Image memory 205 has a storage capacity large enough to store a predetermined number of still image data, movie data and audio data for a predetermined period of time.

Figure 3:
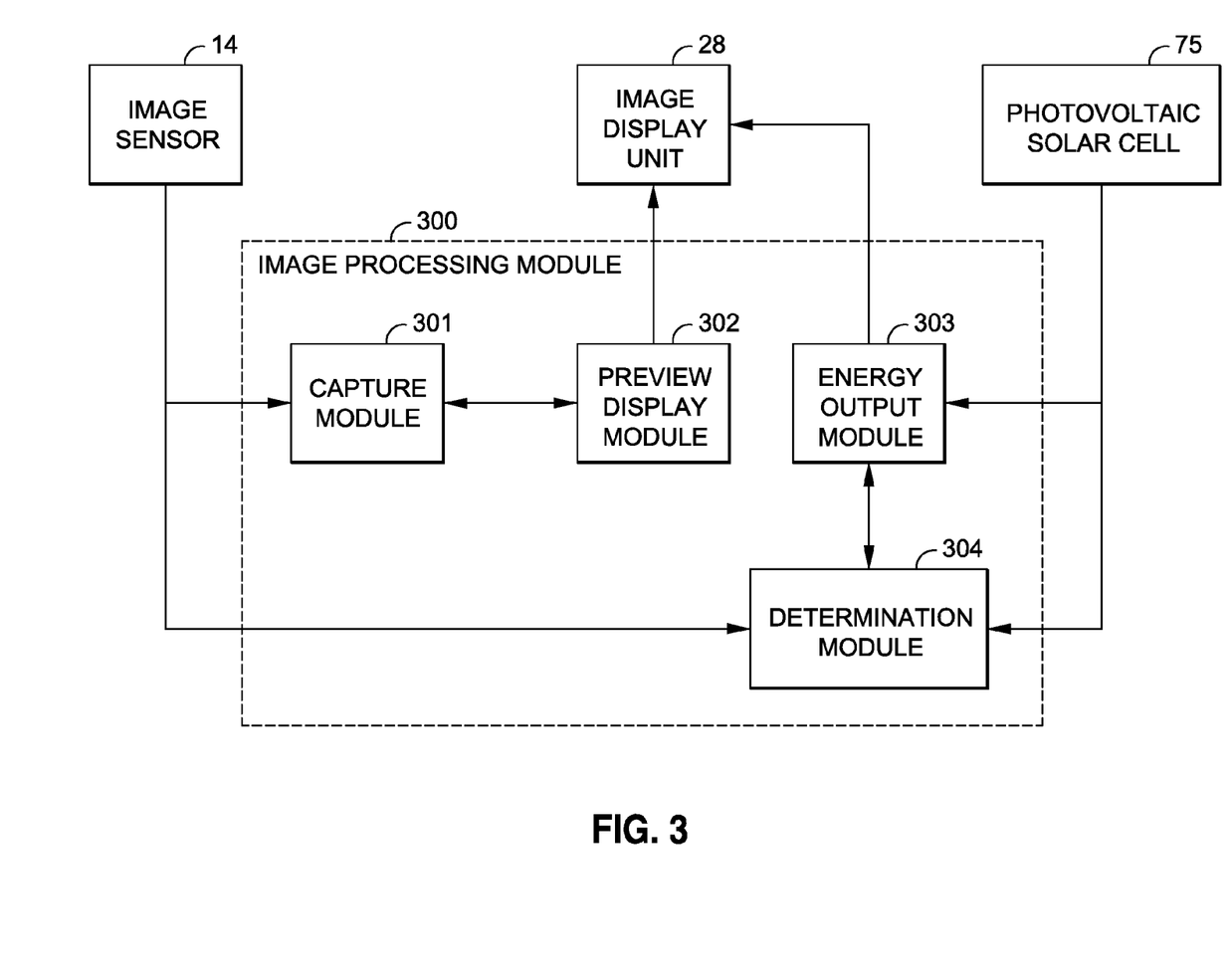
FIG. 3 is a view for explaining an image processing module according to one example embodiment.

FIG. 3 is a view for explaining an image processing module according to one example embodiment. As previously discussed with respect to FIG. 2B, image processing module 300 comprises computer-executable process steps stored on a non-transitory computer-readable storage medium, such as non-volatile memory 56. More or less modules may be used, and other architectures are possible.

In this example embodiment, as shown in FIG. 3, image processing module 300 includes capture module 301, preview display module 302, energy output module 303 and determination module 304.

Specifically, image processing module 300 includes capture module 301, which communicates with image sensor 14. Image capture module 301 captures image data obtained by image sensor 14 for use in forming a preview image or forming an output image. Capture module 301 also communicates with preview display module 302 to provide image data for preview display module 302 to display on a preview display, as discussed more fully below. In that regard, the "capture" may be ongoing. For example, a preview display image often provides a continuous view of image data of a scene, thus the image data may be captured dynamically, as opposed to permanently capturing a single scene.

Image processing module 300 further includes preview display module 302 for displaying a preview of the captured image of a scene on a display screen, such as a display screen of image display unit 28. Preview display module communicates with capture module 301 in order to obtain image data of a captured scene for display.

Image processing module 300 also includes energy output module 303 for managing electrical energy which is output in response to environmental lighting conditions. The electrical energy may be output by a photovoltaic solar cell, such as photovoltaic solar cell 75. Additionally, energy output module 303 provides information obtained via photovoltaic solar cell 75 to determination module 304, for use in a determination of whether environmental conditions qualify as "bright". Energy output module 303 may provide energy to image display unit 28 in order to brighten or otherwise enhance a display of a preview image. These processes will be described in more detail below.

Additionally, image processing module 300 includes determination module 304 for determining whether the image capture device is or is not currently being used in a bright environment. Determination module 304 communicates with image sensor 14 and with photovoltaic solar cell 75 to gather information to make such determination, and communicates with energy output module 303 to control according to the result of such determination. In one example, luminance information of the scene is obtained by calculations using the image data from image sensor 14, and the determination of a bright environment is made based on the luminance information. In another example, brightness information indicative of the environmental lighting conditions is obtained by sampling the electrical energy from photovoltaic solar cell 75, and the determination of a bright environment is made based on the brightness information. Responsive to a determination that the image capture device is currently being used in a bright environment, the brightness of the display screen is increased and electrical energy outputted from photovoltaic solar cell 75 is switched for use by the display screen, as described more fully below.

In some embodiments, if image capture device 100 is being used in an image capture mode, determination module 304 may also determine whether to enhance the image quality of the preview displayed by the display screen, based on luminance information of the scene obtained by calculations using the image data from image sensor 14, and based on brightness information indicative of the environmental lighting conditions obtained by sampling the electrical energy from photovoltaic solar cell 75. For example, chromatic information of the scene can be obtained by calculations using image data from image sensor 14, and an enhancement of image quality of the preview displayed by the display screen can be effected by increasing colorfulness of the chromatic information in a case where there is a determination that the image capture device is currently being used in a bright environment.

Figure 4:
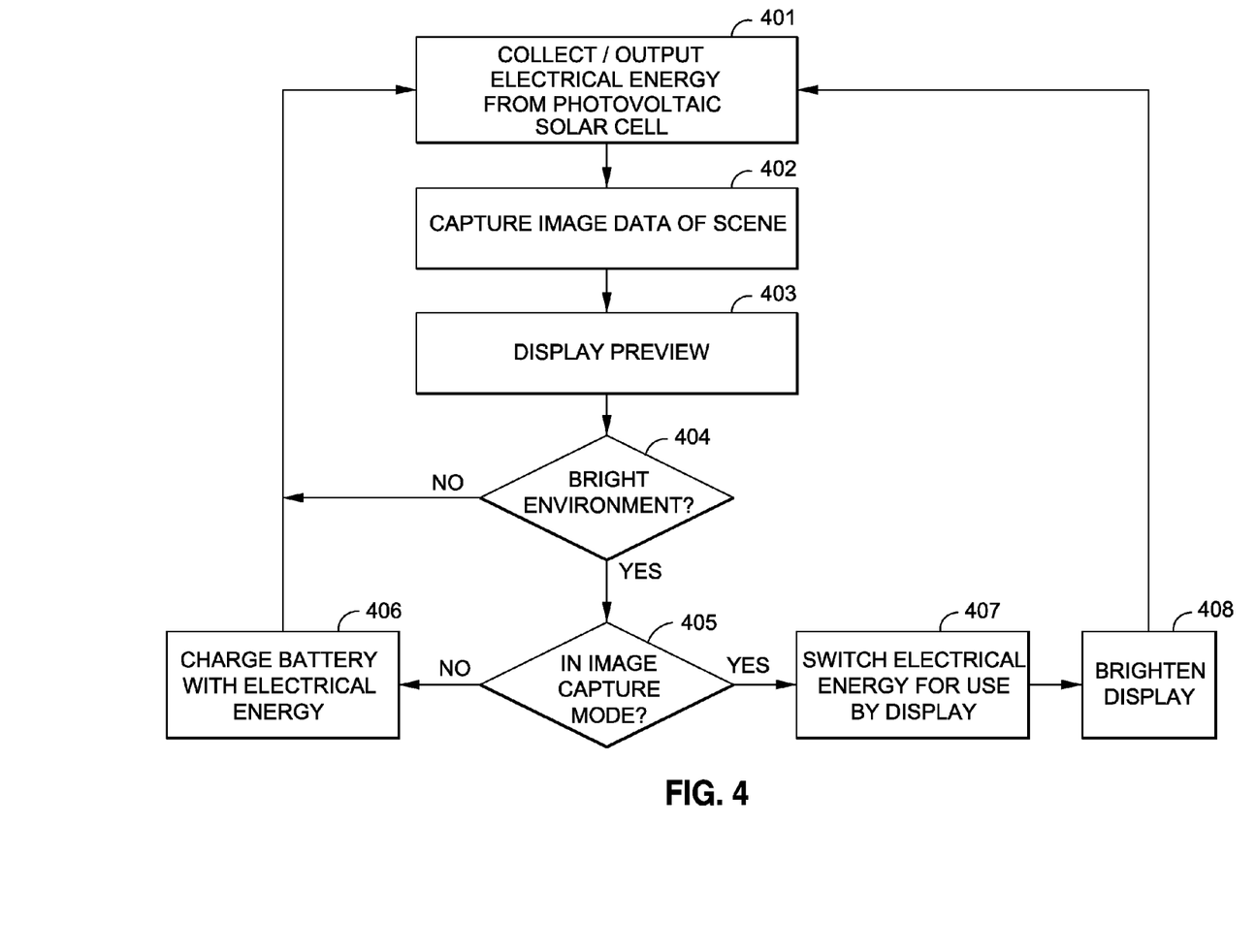
FIG. 4 is a flow diagram for explaining processing in the image capture device shown in FIG. 1 according to one example embodiment.

FIG. 4 is a flow diagram for explaining processing in the image capture device shown in FIG. 1 according to one example embodiment.

Briefly, in FIG. 4, image data of a scene is captured with an image sensor, and electrical energy is output responsive to environmental lighting conditions. The electrical energy is output by a photovoltaic solar cell. A preview of the captured image of the scene is displayed on a display screen. There is a determination of whether the image capture device is or is not currently being used in a bright environment. Responsive to a determination that the image capture device is currently being used in a bright environment, the brightness of the display screen is increased, and electrical energy outputted from the photovoltaic cell is switched for use by the display screen. In particular, in one example, the display screen is brightened. Additionally, responsive to a determination that the image capture device is not currently being used in the image capture mode, electrical energy outputted from the photovoltaic solar cell is switched for use in recharging a rechargeable battery.

In that regard, it should be understood that FIG. 4 is intended to provide a conceptual view of the nature of the processes performed. Thus, some steps in FIG. 4 are performed continuously, or the particular order and sequence of steps might change. For example, an image capture device according to the present disclosure may continuously collect electrical energy from a photovoltaic cell, while also capturing an image for a scene and displaying a preview of a captured image of the scene on a display screen.

In step 401, electrical energy is output responsive to environmental lighting conditions. The electrical energy is output by a photovoltaic solar cell, such as photovoltaic solar cell 75. Thus, for example, if a camera operator is standing outside in a bright environment, electrical energy collected by photovoltaic cell 75 may be output. In that regard, the output electrical energy may be transferred to another part of the camera such as image display 28.

The electrical energy output from photovoltaic cell may also be used for purposes other than generating power. For example, in some image sensing environments, data from an image sensor alone may provide an incomplete impression of actual environmental lighting conditions. For example, a single bright area in a scene sensed by an image sensor alone may unduly influence a determination of brightness.

Accordingly, electrical energy from the photovoltaic cell may also be used for a determination of brightness, either alone or in combination with data from the image sensor. For example, brightness information indicative of the environmental lighting conditions can be obtained by sampling the electrical energy from the photovoltaic solar cell, and the determination of a bright environment can be made based on the brightness information. In that regard, luminance information gathered by the photovoltaic solar cell can be estimated from a histogram or by a median luminance value, or by other methods.

In step 402, image data of a scene is captured. For example, image sensor 14 may capture image data of a scene currently viewed by the camera lens. As mentioned above, the image capture may be ongoing. For example, a preview display image often provides a continuous view of image data of a scene, thus the image data is captured dynamically, as opposed to permanently capturing a single scene.

The image data of the scene may be used for more than simply displaying a preview image of the scene, or permanently capturing a scene. For example, in one embodiment, luminance information of the scene is obtained by exposure meter 203 and by calculations using the image data from the image sensor, and the determination of a bright environment is made based on the luminance information. In that regard, standard camera analysis often determines a luminance level from a captured image, and several methods exist.

Thus, both or either of the photovoltaic solar cell and the image sensor may be used to determine whether the image capture device is currently being used in a bright environment. For example, the brightness determination can be made based on luminance information of the scene obtained by calculations using the image data from the image sensor (e.g., using the exposure meter), and/or based on brightness information indicative of the environmental lighting conditions obtained by sampling the electrical energy from the photovoltaic solar cell.

In step 403, a preview image is displayed to a user of the image capture device. Generally, step 403 may be continuously performed as long as the image capture device is in an image capture mode. The preview allows the display of the device (e.g., image display unit 28) to be used as a viewfinder, that is, as a means of previewing exposure and/or previewing framing before taking a photograph. In one example, the preview is generated by means of continuously and directly projecting the image formed by the lens 10 onto image sensor 14, which in turn feeds image display unit 28 with the live preview image.

In step 404, there is a determination of whether the image capture device is or is not currently being used in a bright environment. As discussed above, such determination may be based on luminance information of the scene is obtained by calculations using the image data from the image sensor, on brightness information indicative of the environmental lighting conditions can be obtained by sampling the electrical energy from the photovoltaic solar cell, or on some combination of the two.

For example, a look-up table (LUT) can correlate signals from either the sensor, the photovoltaic cell or both to particular luminance values or ranges. In one example, the LUT or other storage may indicate levels of brightness and/or whether additional brightness of the display is needed, based on the obtained luminance information or the brightness information obtained from the photovoltaic solar cell. In that regard, since the display (and particularly the brightening thereof) consumes the most energy of the image capture device, the LUT may also take current battery life into consideration, i.e., the threshold for adding brightness may be set higher if the battery life is already low. The LUT could be pre-set by the manufacturer, or otherwise set by a user or system.

In one embodiment, the luminance information from the image sensor and/or the brightness information from the photovoltaic solar cell may be converted into an image change descriptor, as described below with respect to FIG. 5.

If there is a determination that the image capture device is not in a bright environment, then there is ordinarily little need to brighten the display, or enough brightness to generate useful energy for brightening the display (or for charging the battery). Accordingly, in such a case, the process proceeds back to step 401 to continue collecting electrical energy from a photovoltaic cell, while also capturing an image for a scene and displaying a preview of a captured image of the scene on a display screen. There is ordinarily little such energy in a non-bright environment, but what little there is may be switched with switch 202 for use in charging the battery 204.

On the other hand, if there is a determination that the image capture device is in a bright environment, the process proceeds to step 405 for a further determination of whether the image capture device is in an image capture mode.

In step 405, there is a determination of whether the image capture device is in an image capture mode. For example, the determination may be based on whether a user has set an image capture mode via a switch, dial, or other input. If the image capture device is not currently being used in an image capture mode, the process proceeds to step 406. If the image capture device is currently being used in an image capture mode, the process proceeds to step 407.

In step 406, responsive to a determination that the image capture device is not currently being used in the image capture mode, electrical energy outputted from the photovoltaic solar cell is switched for use in recharging the rechargeable battery. Thus, it is ordinarily possible to make efficient use of energy from the photovoltaic solar cell in a bright environment, even when the user is not displaying a preview or otherwise intending to capture an image. Following step 406, the process returns to step 401.

On the other hand, in step 407, responsive to a determination that the image capture device is currently being used in a bright environment and a further determination that the image capture device is currently being used in an image capture mode, the electrical energy outputted from the photovoltaic cell is switched for use by the display screen, and in step 408, the display screen is brightened. Thus, the brighter screen allows the user to more easily see the preview display, while the electrical energy from the photovoltaic solar cell compensates, at least in part, for the resulting increase in required power. In that regard, the electrical energy from the photovoltaic solar cell may replace the usage of battery power completely, or may simply be used to augment power coming from the battery. Moreover, the amount of energy respectively from the solar cell and battery may be determined according to the detected luminance level, or according to an image change descriptor described below.

Figure 5:
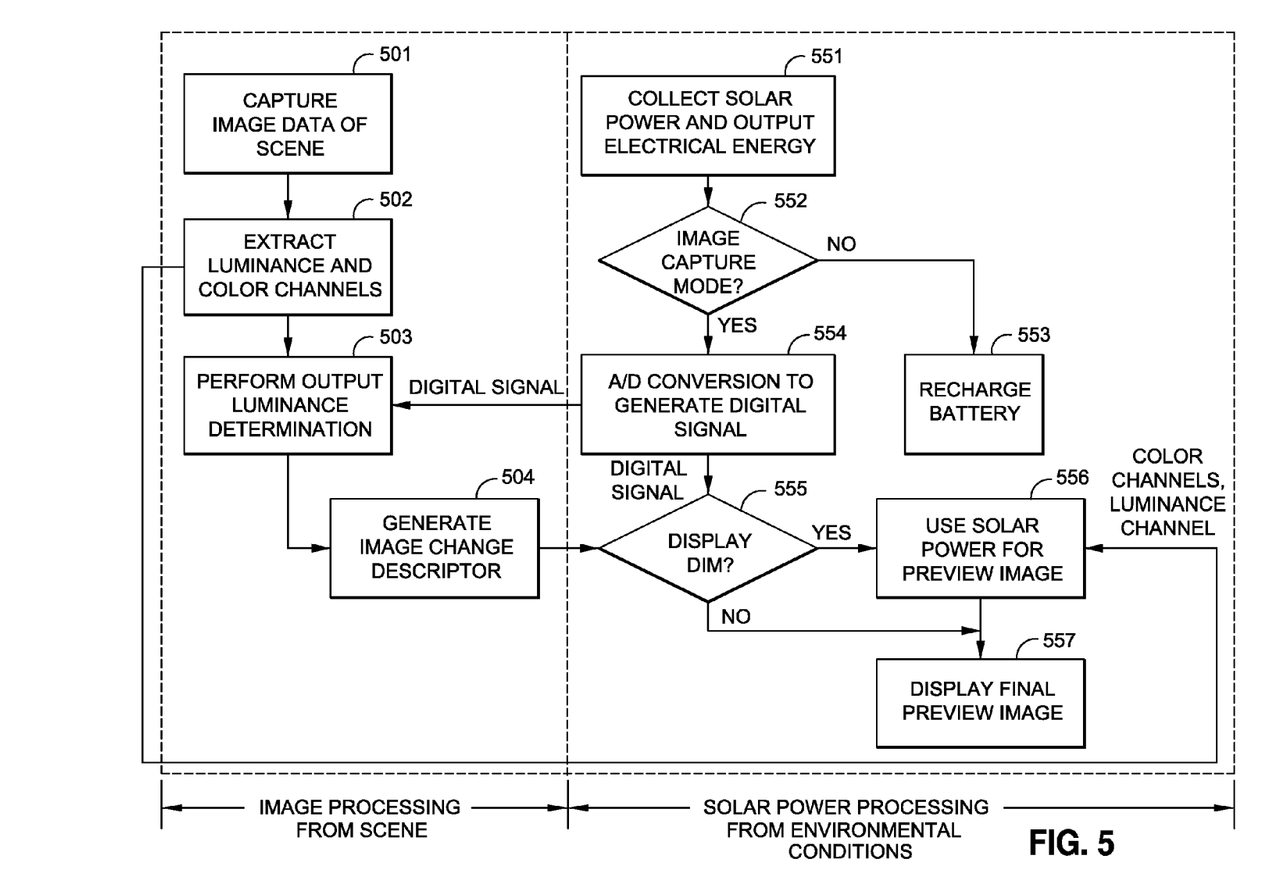
FIG. 5 is a flow diagram for explaining processing in the image capture device shown in FIG. 1 according to another example embodiment.

FIG. 5 is a flow diagram for explaining processing in the image capture device shown in FIG. 1 according to another example embodiment. Specifically, the left half of FIG. 5 is related to actions or events occurring during the image processing from the scene (e.g., image data gathered from image sensor 14), whereas the right side of FIG. 5 is more closely related to solar power processing using energy obtained from the photovoltaic solar cell 75.

In step 501, the image capture device captures image data of a scene. As described above with respect to FIG. 4, image sensor 14 may capture image data of a scene currently viewed by the camera lens.

In step 502, luminance and color channels are extracted from the image data sensed by the image sensor. In that regard, the luminance and color channel data are also passed to step 556 for use in enhancements or corrections to the preview image, such as brightening the image, increasing colorfulness of the image, and others described more fully below with respect to FIG. 6. The luminance and color channel data are also passed to step 503 for use in generating an image change descriptor.

At step 503, an output luminance determination is performed, using the luminance channel from the image sensor in combination with a digital signal obtained from the photovoltaic solar cell. In one example embodiment, there is a calculation of the significant statistics of the luminance channel (such as percentiles, medians, maximum values, or in this embodiment a medium or default value), and these statistics are compared with the digital signal from converted from the photovoltaic solar cell, to determine what contrast and brightness changes are necessary. In one example, this is performed by a pre-calculated table that maps each pair combination of image luminance and digital signal level from the A/D converter to a pair of adjustments in contrast and brightness.

As a result of output luminance determination, an image change descriptor is generated in step 504. The image change descriptor is used to determine whether the preview display is dim (and therefore requires additional brightness and/or other corrections). In particular, the image change descriptor indicates changes that need to be made from a medium or default value. For example, if both the luminance channel from the sensor and digital signal from the photovoltaic solar cell are high, an image change descriptor is generated which indicates to increase contrast but not brightness, because the information indicates a bright image in a bright environment. If the luminance channel from the sensor is low but the digital signal from the photovoltaic solar cell is high, there is a need to increase brightness and contrast to make a dim image stand out in a bright environment. In that regard, the image change descriptor may also indicate particular contrast/brightness/other values which should be applied or added to the displayed preview image. The process then proceeds to step 555.

Meanwhile, on the solar power processing side, in step 551 the photovoltaic solar cell collects solar power and outputs electrical energy, as described above with respect to FIG. 4.

In step 552, there is a determination of whether the image capture device is in an image capture mode. As described above, the determination may be based on whether a user has set an image capture mode via a switch, dial, or other input, although other methods are of course possible. If the image capture device is not currently being used in an image capture mode, the process proceeds to step 553. If the image capture device is currently being used in an image capture mode, the process proceeds to step 554.

In step 553, responsive to a determination that the image capture device is not currently being used in the image capture mode, electrical energy outputted from the photovoltaic solar cell is switched for use in recharging the rechargeable battery.

In step 554, responsive to a determination that the image capture device is currently being used in the image capture mode, the analog electrical signal(s) from the solar cell are converted to a digital signal, for use in determining whether the preview image display needs to be brightened or otherwise enhanced. If multiple solar cells are used, an average signal can be generated. The generated digital signal correlates with the overall environmental brightness level, and the conversion can be pre-calibrated based on the photo-conversion efficiency of the solar cell(s) and the conversion curve of the A/D converter. The digital signal from the conversion is used both by the output luminance determination in step 503, as well as in the determination of whether the preview display is dim in step 555. After the digital signal is generated, the process proceeds to step 555.

In step 555, there is a determination of whether the preview display image is dim relative to the overall environmental brightness level. This determination can be accomplished by, for example, comparing the digital signal from the A/D conversion with the image change descriptor, and determining whether the two differ. If the digital signal (e.g., representative of the current conditions) differs from the desired values represented by the image change descriptor, then there is a determination that the preview display is dim relative to the overall environmental brightness level, and brightening and/or correction is needed. If the preview is not dim relative to the overall environmental brightness level, the process proceeds to step 557 to display the final preview image without change. On the other hand, if the preview display is dim relative to the overall environmental brightness level, the process proceeds to step 556.

In step 556, responsive to a determination that the preview display is dim relative to the overall environmental brightness level, the solar power is switched for use by the preview image. In particular, in one example, the solar power may be switched to the display 28 while controller 200 increases the brightness of the preview image, allowing the user to more easily view the display in a bright environment. Step 556 may also input the luminance and color channels extracted from the image data captured by the image sensor to perform numerous other corrections and/or enhancements in addition to increasing brightness, as described more fully below with respect to FIG. 6. In that regard, while this embodiment has been described with regard to an automatic switch to powering the preview display using the solar power if the display is dim relative to the overall environmental brightness level, it is also possible to provide for a manual switch. For example, upon a detection that the display is dim relative to the overall environmental brightness level, the image capture device could query the user whether to switch power to increase the brightness of the display.

In step 557, a final preview image is displayed.

Figure 6:
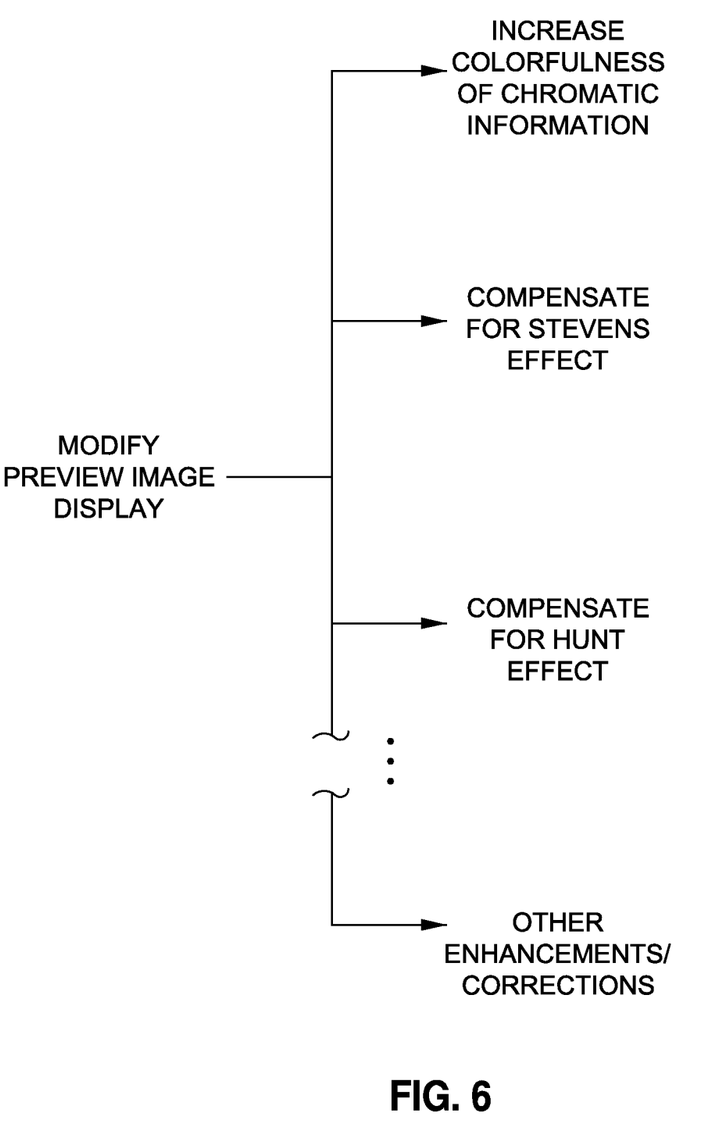
FIG. 6 is a view for explaining examples of enhancements to a preview image according to an example embodiment.

FIG. 6 is a view for explaining examples of enhancements to a preview image according to an example embodiment.

In particular, FIG. 6 is a view for explaining different types of ways to improve or correct the view of the preview display under different lighting conditions. In that regard, some of these improvements may also make use of the color channel information obtained from the image sensor.

For example, colorfulness of the chromatic information is increased in a case where there is a determination that the image capture device is currently being used in a bright environment. Specifically, responsive to a determination that the image capture device is currently being used in an image capture mode, there is a determination of whether to enhance the image quality of the preview displayed by the display screen based on luminance information of the scene obtained by calculations using the image data from the image sensor, and/or based on brightness information indicative of the environmental lighting conditions obtained by sampling the electrical energy from the photovoltaic solar cell. In particular, system controller 200 may obtain chromatic information of the scene by calculations using the image data from the image sensor, and effect an enhancement of image quality of the preview displayed by the display screen by increasing colorfulness of the chromatic information in a case where there is a determination that the image capture device is currently being used in a bright environment.

Another common correction is to increase colorfulness to compensate for the "Hunt Effect", in which image saturation increases with increased luminance. Still another correction is to compensate for the "Stevens Effect", in which perceived contrast increases with luminance. Numerous other corrections (e.g., gamma correction) and adjustments exist.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

By using energy gathered from a photovoltaic solar cell for use in display of the preview image, it is ordinarily possible for a user to more clearly view the preview image in inferior environmental conditions, while at the same time conserving battery power.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An image capture device comprising:
an image sensor for capturing image data of a scene;
a display screen for displaying a preview of the captured image of the scene;
a photovoltaic solar cell for outputting electrical energy responsive to environmental lighting conditions; and
a control section constructed to determine whether the image capture device is or is not currently being used in a bright environment,
wherein responsive to a determination that the image capture device is currently being used in a bright environment, the control section switches electrical energy outputted from the photovoltaic cell for use by the display screen and increases luminance of the display screen, and compensates for colorfulness change with luminance as described by Hunt effect and contrast change with luminance as described by Stevens effect.

2. The image capture device according to claim 1, further comprising a battery compartment for holding a rechargeable battery, wherein the control section is further constructed to determine whether the image capture device is or is not currently being used in an image capture mode, and wherein responsive to a determination that the image capture device is not currently being used in the image capture mode, the control section switches electrical energy outputted from the photovoltaic solar cell for use in recharging the rechargeable battery.

3. The image capture device according to claim 1, wherein the control section is further constructed to obtain luminance information of the scene by calculations using the image data from the image sensor, and wherein the determination of a bright environment is made based on the luminance information.

4. The image capture device according to claim 1, wherein the control section is further constructed to obtain brightness information indicative of the environmental lighting conditions by sampling the electrical energy from the photovoltaic solar cell, and wherein the determination of a bright environment is made based on the brightness information.

5. The image capture device according to claim 2, wherein responsive to a determination that the image capture device is currently being used in an image capture mode, the controller is further constructed to determine whether to enhance the image quality of the preview displayed by the display screen based on luminance information of the scene obtained by calculations using the image data from the image sensor, and based on brightness information indicative of the environmental lighting conditions obtained by sampling the electrical energy from the photovoltaic solar cell.

6. The image capture device according to claim 2, wherein responsive to a determination that the image capture device is currently being used in an image capture mode, the control section is further constructed to obtain chromatic information of the scene by calculations using the image data from the image sensor.

7. The image capture device according to claim 6, wherein responsive to a determination that the image capture device is currently being used in an image capture mode, the control section effects an enhancement of image quality of the preview displayed by the display screen by increasing colorfulness of the chromatic information in a case where there is a determination that the image capture device is currently being used in a bright environment.

8. A method for an image capture device, comprising:
capturing image data of a scene with an image sensor;
displaying a preview of the captured image of the scene on a display screen;
outputting electrical energy responsive to environmental lighting conditions, wherein the electrical energy is output by a photovoltaic solar cell; and
determining whether the image capture device is or is not currently being used in a bright environment,
wherein responsive to a determination that the image capture device is currently being used in a bright environment, the luminance of the display screen is increased, and colorfulness change with luminance as described by Hunt effect and contrast change with luminance as described by Stevens effect are compensated for.

9. The method according to claim 8, wherein the image capture device further comprises a battery compartment for holding a rechargeable battery, wherein there is a determination of whether the image capture device is or is not currently being used in an image capture mode, and wherein responsive to a determination that the image capture device is not currently being used in the image capture mode, electrical energy outputted from the photovoltaic solar cell is switched for use in recharging the rechargeable battery.

10. The method according to claim 8, wherein luminance information of the scene is obtained by calculations using the image data from the image sensor, and wherein the determination of a bright environment is made based on the luminance information.

11. The method according to claim 8, wherein brightness information indicative of the environmental lighting conditions is obtained by sampling the electrical energy from the photovoltaic solar cell, and wherein the determination of a bright environment is made based on the brightness information.

12. The method according to claim 9, wherein responsive to a determination that the image capture device is currently being used in an image capture mode, there is a determination of whether to enhance the image quality of the preview displayed by the display screen based on luminance information of the scene obtained by calculations using the image data from the image sensor and based on brightness information indicative of the environmental lighting conditions obtained by sampling the electrical energy from the photovoltaic solar cell.

13. The method according to claim 9, wherein responsive to a determination that the image capture device is currently being used in an image capture mode, chromatic information of the scene is obtained by calculations using the image data from the image sensor.

14. The method according to claim 13, wherein responsive to a determination that the image capture device is currently being used in an image capture mode, an enhancement of image quality of the preview displayed by the display screen is effected by increasing colorfulness of the chromatic information in a case where there is a determination that the image capture device is currently being used in a bright environment.

15. An image processing module for an image capture device, comprising:
 a capture module for capturing image data of a scene with an image sensor;
 a preview display module for displaying a preview of the captured image of the scene on a display screen;
 an energy output module for managing electrical energy output in response to environmental lighting conditions, wherein the electrical energy is output by a photovoltaic solar cell; and
 a determination module for determining whether the image capture device is or is not currently being used in a bright environment,
 wherein responsive to a determination that the image capture device is currently being used in a bright environment, the luminance of the display screen is increased, and colorfulness change with luminance as described by Hunt effect and contrast change with luminance as described by Stevens effect are compensated for.

16. The image processing module according to claim 15, wherein the image capture device further comprises a battery compartment for holding a rechargeable battery, wherein there is a determination of whether the image capture device is or is not currently being used in an image capture mode, and wherein responsive to a determination that the image capture device is not currently being used in the image capture mode, electrical energy outputted from the photovoltaic solar cell is switched for use in recharging the rechargeable battery.

17. The image processing module according to claim 15, wherein luminance information of the scene is obtained by calculations using the image data from the image sensor, and wherein the determination of a bright environment is made based on the luminance information.

18. The image processing module according to claim 15, wherein brightness information indicative of the environmental lighting conditions is obtained by sampling the electrical energy from the photovoltaic solar cell, and wherein the determination of a bright environment is made based on the brightness information.

19. The image processing module according to claim 16, wherein responsive to a determination that the image capture device is currently being used in an image capture mode, there is a determination of whether to enhance the image quality of the preview displayed by the display screen based on luminance information of the scene obtained by calculations using the image data from the image sensor and based on brightness information indicative of the environmental lighting conditions obtained by sampling the electrical energy from the photovoltaic solar cell.

20. The image processing module according to claim 16, wherein responsive to a determination that the image capture device is currently being used in an image capture mode, chromatic information of the scene is obtained by calculations using the image data from the image sensor.

21. The image processing module according to claim 20, wherein responsive to a determination that the image capture device is currently being used in an image capture mode, an enhancement of image quality of the preview displayed by the display screen is effected by increasing colorfulness of the chromatic information in a case where there is a determination that the image capture device is currently being used in a bright environment.

22. A non-transitory computer-readable storage medium storing computer-executable process steps for an image capture device, for performing a method for enhancing a preview image, the method comprising:
 capturing image data of a scene with an image sensor;
 displaying a preview of the captured image of the scene on a display screen;
 outputting electrical energy responsive to environmental lighting conditions, wherein the electrical energy is output by a photovoltaic solar cell; and
 determining whether the image capture device is or is not currently being used in a bright environment,
 wherein responsive to a determination that the image capture device is currently being used in a bright environment, the luminance of the display screen is increased, and colorfulness change with luminance as described by Hunt effect and contrast change with luminance as described by Stevens effect are compensated for.

23. The computer-readable storage medium according to claim 22, wherein the image capture device further comprises a battery compartment for holding a rechargeable battery, wherein there is a determination of whether the image capture device is or is not currently being used in an image capture mode, and wherein responsive to a determination that the image capture device is not currently being used in the image capture mode, electrical energy outputted from the photovoltaic solar cell is switched for use in recharging the rechargeable battery.

24. The computer-readable storage medium according to claim 22, wherein luminance information of the scene is obtained by calculations using the image data from the image sensor, and wherein the determination of a bright environment is made based on the luminance information.

25. The computer-readable storage medium according to claim 22, wherein brightness information indicative of the environmental lighting conditions is obtained by sampling the electrical energy from the photovoltaic solar cell, and wherein the determination of a bright environment is made based on the brightness information.

26. The computer-readable storage medium according to claim 23, wherein responsive to a determination that the image capture device is currently being used in an image capture mode, there is a determination of whether to enhance the image quality of the preview displayed by the display screen based on luminance information of the scene obtained by calculations using the image data from the image sensor and based on brightness information indicative of the environmental lighting conditions obtained by sampling the electrical energy from the photovoltaic solar cell.

27. The computer-readable storage medium according to claim 23, wherein responsive to a determination that the image capture device is currently being used in an image capture mode, chromatic information of the scene is obtained by calculations using the image data from the image sensor.

28. The computer-readable storage medium according to claim 27, wherein responsive to a determination that the image capture device is currently being used in an image capture mode, an enhancement of image quality of the preview displayed by the display screen is effected by increasing colorfulness of the chromatic information in a case where there is a determination that the image capture device is currently being used in a bright environment.

29. An image capture device comprising:
an image sensor for capturing image data of a scene;
a display screen for displaying a preview of the captured image of the scene;
a photovoltaic solar cell for outputting electrical energy responsive to environmental lighting conditions; and
a control section constructed to determine an ambient luminance level,
wherein responsive to a determination of the ambient luminance level, the control section switches electrical energy outputted from the photovoltaic cell for use by the display screen and adjusts a luminance of the display screen, and compensates for colorfulness change with luminance as described by Hunt effect and contrast change with luminance as described by Stevens effect.

* * * * *